US009969860B2

(12) United States Patent
Wulff et al.

(10) Patent No.: US 9,969,860 B2
(45) Date of Patent: May 15, 2018

(54) NON-AQUEOUS SOUND-ABSORBING COMPOUND WITH A SOLVENT-FREE POLYACRYLATE BINDER

(71) Applicant: BASF SE, Ludwigshafen (DE)

(72) Inventors: Dirk Wulff, Schifferstadt (DE); Ulrike Licht, Mannheim (DE); Peter Preishuber-Pfluegl, Mannheim (DE); Axel Weiss, Speyer (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 14/400,674

(22) PCT Filed: Apr. 25, 2013

(86) PCT No.: PCT/EP2013/058660
§ 371 (c)(1),
(2) Date: Nov. 12, 2014

(87) PCT Pub. No.: WO2013/174611
PCT Pub. Date: Nov. 28, 2013

(65) Prior Publication Data
US 2015/0097136 A1    Apr. 9, 2015

Related U.S. Application Data

(60) Provisional application No. 61/649,956, filed on May 22, 2012.

(30) Foreign Application Priority Data

May 22, 2012   (EP) ..................... 12168883

(51) Int. Cl.
| | | |
|---|---|---|
| *C09J 133/08* | (2006.01) | |
| *C09J 133/10* | (2006.01) | |
| *C09J 133/14* | (2006.01) | |
| *C08K 3/34* | (2006.01) | |
| *C08K 3/00* | (2018.01) | |
| *C08K 3/26* | (2006.01) | |
| *C08K 3/30* | (2006.01) | |
| *F16D 65/00* | (2006.01) | |

(52) U.S. Cl.
CPC .............. *C08K 3/34* (2013.01); *C08K 3/0033* (2013.01); *C08K 3/26* (2013.01); *C08K 3/30* (2013.01); *C09J 133/14* (2013.01); *C08K 2003/265* (2013.01); *C08K 2003/3045* (2013.01); *F16D 65/0006* (2013.01)

(58) Field of Classification Search
CPC ....... C09J 133/08; C09J 133/10; C09J 133/14
See application file for complete search history.

(56) References Cited

U.S. PATENT DOCUMENTS

| | | | |
|---|---|---|---|
| 5,120,795 A | 6/1992 | Filges et al. | |
| 5,851,327 A | 12/1998 | Landin | |
| 2002/0168517 A1* | 11/2002 | Husemann | ............. C09J 7/0217 428/355 AC |
| 2004/0033354 A1 | 2/2004 | Fisher et al. | |
| 2004/0082721 A1 | 4/2004 | Miura et al. | |
| 2004/0087721 A1* | 5/2004 | Bruhn | ................. C08L 23/0869 525/132 |
| 2004/0256605 A1* | 12/2004 | Reinheimer | ............. C08K 9/02 252/606 |
| 2005/0217789 A1* | 10/2005 | Eckstein | ................... B32B 7/12 156/244.11 |
| 2009/0280322 A1* | 11/2009 | Daniels | .................. C09J 133/04 428/354 |
| 2011/0129632 A1* | 6/2011 | Jauer | ...................... C09J 7/0217 428/41.8 |
| 2012/0027941 A1 | 2/2012 | Fonseca et al. | |

FOREIGN PATENT DOCUMENTS

| | | |
|---|---|---|
| DE | 40 11 914 | 10/1991 |
| DE | 10 2005 021 017 | 11/2006 |
| DE | 10 2005 023 319 | 11/2006 |
| DE | 10 2006 052 282 A1 | 5/2008 |
| DE | 10 2009 046 739 | 5/2011 |
| EP | 1 413 603 A1 | 4/2004 |
| EP | 1 520 865 A2 | 4/2005 |
| EP | 1 935 941 A1 | 6/2008 |
| EP | 2 420 412 A1 | 2/2012 |
| JP | 02196848 A * | 8/1990 |
| JP | 04-202333 | 7/1992 |
| JP | 10-503575 | 3/1998 |
| JP | 2001-247744 | 9/2001 |
| JP | 2004-162061 | 6/2004 |

(Continued)

OTHER PUBLICATIONS

Machine translation into English of JP 02-196848 A; Arai; Aug. 1990.*

International Search Report dated Aug. 2, 2013 in corresponding PCT/EP2013/058660.

Japanese Notification of Reasons for Refusal dated Mar. 6, 2017 in connection with corresponding Japanese Patent Application No. 2015-513068, filed Apr. 25, 2013.

Notice of Opposition dated May 15, 2017 in connection with European Patent Application No. 13721301.3, filed Apr. 25, 2013. Excerpt: Data Sheet KBE-903.

(Continued)

*Primary Examiner* — Karuna P Reddy

(74) *Attorney, Agent, or Firm* — Oblon, McClelland, Maier & Neustadt, L.L.P.

(57) ABSTRACT

A description is given of a nonaqueous sound deadener composition comprising (a) a nonpulverulent, solvent-free polyacrylate binder having a K value in the range from 10 to 35, measured as a 1% strength solution in tetrahydrofuran; and (b) inorganic fillers. Also described is a method for damping oscillations or vibrations of components of vehicles and machines, using the sound deadener composition of the invention.

19 Claims, No Drawings

(56) References Cited

FOREIGN PATENT DOCUMENTS

| | | |
|---|---|---|
| JP | 2008-120928 | 5/2008 |
| JP | 2010-235887 | 10/2010 |
| JP | 2012-25830 | 2/2012 |
| WO | WO 01/90264 A1 | 11/2001 |
| WO | 2006/046472 | 5/2006 |
| WO | WO 2007/034933 A1 | 3/2007 |
| WO | WO 2009150044 A1 * | 12/2009 ............ C09J 7/0217 |
| WO | 2013/174611 | 11/2013 |

OTHER PUBLICATIONS

Excerpt: Data sheet of Silquest® A-1 100.
Excerpt: Product information regarding Acronal® 3500.

* cited by examiner

NON-AQUEOUS SOUND-ABSORBING COMPOUND WITH A SOLVENT-FREE POLYACRYLATE BINDER

The invention relates to a nonaqueous sound deadener composition comprising (a) a nonpulverulent, solvent-free polyacrylate binder having a K value in the range from 10 to 35, measured as a 1% strength solution in tetrahydrofuran, and (b) inorganic fillers. The invention also relates to a method for damping oscillations or vibrations of components of vehicles and machines. The polyacrylate binder can be used as a raw material for producing coating compositions for automaking, for example, that are suitable for damping noise and vibration.

Oscillating vehicle parts such as the engine, tires or transmission, for example, give rise to bodywork vibrations that can lead to unpleasant booming noises within the passenger compartment. For this reason, vibration damping systems are applied in a targeted way to those areas of the bodywork that are affected. These systems are intended to damp the bodywork vibrations that arise. The principal damping system used in Europe comprises bitumen mats, which in a labor-intensive workstep must be installed in the bodywork and bonded adhesively by hand. Used now for a few years have been, alternatively, pumpable and sprayable compositions, known as LASD (liquid applied sound damping) compositions, which can be applied rapidly and precisely by spraying robots. In comparison to bitumen mats, this technology allows the vehicle manufacturer to achieve a weight saving, on the basis of the higher damping efficiency of sprayable systems. Also possible is a reduction in costs for personnel, logistics, and warehousing, with an attendant reduction in the space taken up and the dust burden arising on the production line.

LASD compositions of this kind comprise not only fillers, which serve for reducing costs and for enhancing damping, but also polymeric fractions. Depending on the form in which they are present, these systems can be divided into aqueous and nonaqueous LASD systems. The polymeric fraction of aqueous LASD compositions is based chiefly on polyacrylate dispersions. The polyacrylate first fulfills the function of the binder, and also ensures the desired damping properties through copolymerization, with styrene or vinyl acetate, for example, or through mixing with other polymers, such as polyurethane, PVC plastisol, silicones or epoxide polymers, for example. By this means it is possible to set desired performance properties such as, for example, damping characteristics or water absorption. Furthermore, dispersions allow a low viscosity in tandem with high solids contents and pseudoplastic behavior on the part of the LASD compositions. This enables spray application at high shearing rates, while in the resting state the composition retains dimensional integrity, without flowing.

The polymeric fraction of nonaqueous LASD compositions is very often based on rubbers, epoxy resins, PVC plastisols, polyurethanes or acrylate powders. The compositions on this basis become fluid by virtue of the melting of the polymers, and are applied to the substrate by subsequent spraying. Compositions which can be applied at room temperature often include plasticizers or low-viscosity binders to allow their processing. These variants require subsequent crosslinking with, for example, epoxidized silanes, peroxides, or reaction to polyurethanes, in order to obtain sufficient dimensional stability. Nonaqueous LASD compositions have the advantage that in the drying stages of the coating plant they usually solidify very quickly and do not, as with the aqueous LASD compositions, generate water vapor, which can lead to unwanted cracking and blistering. Moreover, nonaqueous LASD compositions exhibit good stability toward moisture, and a high abrasion resistance. A possible disadvantage, in the case of epoxy resins, for example, is a severe contraction, which can lead to a distortion in the metal vehicle panel. PVC plastisols have the disadvantage that they contain chlorine, a fact which is frequently undesirable.

Systems based on polyacrylate powders or on polyacrylate plastisols have the disadvantage that they generally use core-shell resins in combination with relatively large amounts of plasticizers, making these systems relatively expensive. The required shell of the polymer particles, moreover, generally has a relatively high glass transition temperature, and this may result in a limit on the damping efficiency of the damping composition at higher temperatures. Furthermore, the acrylate powders are generally prepared by emulsion polymerization followed by spray drying, and the emulsifiers used for the emulsion polymerization may remain in the polymer powders and migrate to the surface following application, and may detract from the adhesion of the damping composition to the metal. Acrylate plastisols, furthermore, include a large amount of plasticizer relative to the mass of solids, and the plasticizer makes no contribution to the damping effect. The result is a relatively low damping effect per unit mass.

Aqueous LASD compositions based on acrylate dispersions are notable for good damping qualities. Aqueous systems are described in EP 1935941, for example. Vibration-damping compositions based on waterborne polymer dispersions and inorganic fillers and also further auxiliaries are known from EP 1520865, WO 2007/034933, WO 01/90264, DE 10 2006 052 282, EP 2420412, and US2012/027941.

An improvement in damping efficiency gives the automakers the possibility to realize a weight saving in comparison to bitumen mats and nonaqueous LASD compositions. In addition, the good toxicological properties of dispersions mean that they are not hampered by safety concerns, and can be processed without additional protective equipment. A disadvantage in the case of applied and dried compositions, however, is a high water absorption, which can lead to an alteration in the properties and which jeopardizes the stability and long life of the applied and dried LASD compositions. Triggers for this tendency toward water absorption include capillary forces on the part of the porous composition, and also hydrophilic auxiliaries such as emulsifiers, dispersing assistants or stabilizers. Damping systems are used not only in the vehicle interior but also in the exterior area, such as wheel housings, engine compartment or cold box. These areas are subject to high humidity. The vibration-damping systems used there thus need to have a high resistance toward water absorption. Consequently, these regions have hitherto been inaccessible to water-based LASD compositions.

Bitumen compositions, though offering very low water absorption, have a relatively poor damping effect relative to the applied weight. Also known are water-free, sprayable systems based on rubber compositions. These compositions, however, have to be vulcanized with sulfur, and this may lead to odor problems.

A major challenge for formulators of LASD compositions is posed, alongside the water absorption, by blistering during drying. The water evaporates from the composition in the drying tunnels of the coating plant. If there is a water vapor barrier in the composition as it dries, the result may be cracking and blistering. In this case, compositions may lift from the bodywork and fail to achieve sufficient vibration damping as a result of inadequate contact with the surface. Moreover, such blistering proves to be a serious manufacturing defect, since it alters the dimensions of the noise damping compositions and thus removes the possibility of uniform operation.

The object is to provide sound deadener compositions which mitigate one or more of the abovementioned disadvantages, more particularly the water absorption of applied LASD compositions, and also minimize or circumvent the problem of blistering and cracking in the drying tunnel. Moreover, the damping achieved ought to be extremely high, relative to applied weight and solids content of the LASD compositions.

It has been found that the object is achieved by means of a nonaqueous sound deadener composition comprising
(a) at least one nonpulverulent, solvent-free polyacrylate binder having a K value in the range from 10 to 35, measured as a 1% strength solution in tetrahydrofuran at 21° C.; and
(b) inorganic fillers.

One preferred use for the sound deadener composition of the invention is for vibration damping of bodywork parts of a vehicle. The invention therefore also provides for the use of a nonpulverulent, solvent-free polyacrylate binder having a K value in the range from 10 to 35, measured as a 1% strength solution in tetrahydrofuran at 21° C. for producing sound deadener compositions.

The term "nonaqueous" means more particularly that no aqueous polymer dispersions are used in preparing the sound deadener compositions.

The term "solvent-free" pertains to what are called "100% systems", where the polymeric binder is used in bulk, in other words not as a solution in an organic solvent. Preparation-related solvent residues of below 5% by weight, for example, based on the polymeric binder, do no harm, since the waste air from the drying ovens can be sent to a downstream incineration facility.

Polyacrylate binders are binders based on polymers which are composed predominantly, i.e., to an extent of more than 50% by weight, of (meth)acrylic esters. The expression "(meth)acryl . . . " is an abbreviated notation for "acryl . . . or methacryl . . . ".

The polyacrylate binders for use in accordance with the invention are polymers having comparatively low, limited molecular weights, and are fluid at least on gentle heating and have a sufficiently low viscosity to allow them to be applied effectively to the substrates that are to be coated. One measure of the molecular weights is the K value (Fikentscher constant). The K value, also referred to as intrinsic viscosity, is a parameter which is easily determined via viscosity measurements of polymer solutions, and under standardized measurement conditions is solely dependent on the average molar mass of the sample under analysis. The K values of the polyacrylate binders are in the range from 10 to 35, preferably 10 to 25, when measured as a 1% strength solution in tetrahydrofuran at 21° C.

The glass transition temperature (Tg) of the polyacrylate binder is preferably −60 to +80° C., more preferably −30 to +60° C. The glass transition temperature can be determined by customary methods such as Differential Scanning Calorimetry (ASTM 3418-08, the midpoint temperature). The nature and amount of the monomers are such that the glass transition temperature of the polyacrylate binder lies within the specified range.

The zero-shear viscosity of the polyacrylate binder at 130° C. is preferably not more than 40 Pa s, preferably not more than 10 Pa s, e.g., 1 to 40 or 1 to 10 Pa s.

Preferred polyacrylate binders are obtainable by polymerization of free-radically polymerizable acrylate monomers, a term which is understood to include methacrylate monomers, and optionally of further, copolymerizable monomers. The polymers are formed preferably to an extent of at least 60%, very preferably at least 80%, by weight from $C_1$ to $C_{10}$ alkyl (meth)acrylates and optionally from further monomers. Mention may be made more particularly of C1-C8 alkyl (meth)acrylates, examples being methyl (meth) acrylate, ethyl (meth)acrylate, n-butyl (meth)acrylate, and 2-ethylhexyl (meth)acrylate.

Further, nonacrylate monomers of which the polyacrylate binder may additionally be composed, are, for example, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and 1 or 2 double bonds, or mixtures of these monomers. Examples of vinylaromatic compounds contemplated include vinyltoluene alpha- and p-methylstyrene, alpha-butylstyrene, 4-n-butylstyrene, 4-n-decylstyrene, and preferably styrene. Examples of nitriles are acrylonitrile and methacrylonitrile. The vinyl halides are chlorine-, fluorine- or bromine-substituted ethylenically unsaturated compounds, preferably vinyl chloride and vinylidene chloride. Examples of vinyl ethers include vinyl methyl ether and vinyl isobutyl ether. Preferred vinyl ethers are those of alcohols comprising 1 to 4 C atoms. Hydrocarbons having 2 to 8 C atoms and two olefinic double bonds include butadiene, isoprene, and chloroprene. Further monomers contemplated also include, in particular, ethylenically unsaturated, free-radically polymerizable acid monomers, examples being monomers having carboxylic, sulfonic or phosphonic acid groups. Carboxylic acid groups are preferred. Examples include acrylic acid, methacrylic acid, itaconic acid, maleic acid, and fumaric acid. Other monomers are also, for example, (meth)acrylamide and monomers containing hydroxyl groups, especially C1-C10 hydroxyalkyl (meth)acrylates. Mention may further be made of phenyloxyethyl glycol mono(meth)acrylate, glycidyl acrylate, glycidyl methacrylate, amino (meth)acrylates such as 2-aminoethyl (meth)acrylate. Monomers which in addition to the double bond also carry further functional groups, e.g., isocyanate-, amino-, hydroxy-, amide- or glycidyl-, may have the effect, for example, of improving the adhesion to substrates.

The further monomers are preferably selected from ethylenically unsaturated, free-radically polymerizable acid monomers, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

The polyacrylate binders may be prepared by copolymerizing the monomeric components using the customary polymerization initiators and also, optionally, regulators, and carrying out polymerization at the customary temperatures in bulk, in emulsion, e.g., in water or liquid hydrocarbons, or in solution. It is preferred to prepare the polyacrylate binders by polymerizing the monomers in organic solvents, more particularly in organic solvents having a boiling range of 50 to 150° C., preferably of 60 to 120° C., using the customary amounts of polymerization initiators, this being generally 0.01% to 10%, more particularly 0.1% to 4%, by weight, based on the total weight of the monomers.

The copolymers can be prepared at temperatures of 20 to 150° C., preferably at temperatures in the range from 70 to 120° C., and at pressures of 0.1 to 100 bar (absolute), preferably at 0.3 to 10 bar, in the presence of 0.01% to 10% by weight of peroxides or azo compounds as polymerization initiators, based on the monomers, and in the presence of 0% to 200% by weight of inert solvents, preferably of 5% to 25% by weight, based on the monomers, i.e., by solution polymerization or bulk polymerization. The reaction takes place preferably under increasingly reduced pressure, as for example by lowering of the pressure from atmospheric pressure (1 bar) to 500 mbar (absolute). Examples of solvents are hydrocarbons such as toluene or o-xylene, alcohols such as methanol, ethanol, propanol, butanol, and isobutanol, ketones such as acetone, methyl ethyl ketone and methyl isobutyl ketone, ethyl acetate, nitriles such as acetonitrile and benzonitrile, or mixtures of the stated solvents.

Examples of polymerization initiators contemplated include azo compounds, ketone peroxides, and alkyl peroxides, examples being acyl peroxides such as benzoyl peroxide, dilauroyl peroxide, didecanoyl peroxide, and isononanoyl peroxide, alkyl esters such as tert-butyl perpivalate, tert-butyl per-2-ethylhexanoate, tert-butyl permaleate, tert-butyl perisononanoate, tert-butyl perbenzoate, and tert-amyl per-2-ethylhexanoate, dialkyl peroxides such as dicumyl peroxide, tert-butyl cumyl peroxide, and di-tert-butyl peroxide, and peroxodicarbonates. As initiators it is further possible for azo starter compounds to be used, such as 2,2'-azobisisobutyronitrile, 2,2'-azobis(methyl isobutyrate) or 2,2'-azobis(2,4-dimethylvaleronitrile), for example.

For implementing the polymerization it is also possible to add compounds that lower the degree of polymerization, known as chain transfer agents, to the reaction mixture, in amounts for example of 0.1 to 0.8 part by weight, based on 100 parts by weight of the monomers to be polymerized. Examples of suitable compounds are those having a thiol group, as for example mercaptans such as mercaptoethanol, tert-butyl mercaptan, mercaptosuccinic acid, ethylhexyl thioglycolate, 3-mercaptopropyltrimethoxysilane or dodecyl mercaptan. In one embodiment no chain transfer agents are used.

The polyacrylate binder is preferably prepared
(a1) to an extent of at least 80% by weight from C1 to C10 alkyl (meth)acrylates and
(a2) to an extent of 0.5% to 20% by weight from monomers having polar groups, the polar groups being selected from carboxylic acid groups, carboxamide groups, pyrrolidone groups, urethane groups, and urea groups.

A particularly preferred polyacrylate binder is prepared from methyl (meth)acrylate (preferably methyl methacrylate), at least one C2 to C4 alkyl acrylate (preferably n-butyl acrylate), and (meth)acrylic acid (preferably acrylic acid), e.g.,
(i) 0% to 99% by weight of methyl (meth)acrylate (preferably methyl methacrylate),
(ii) 0% to 99% by weight of at least one C2 to C10 alkyl acrylate (preferably n-butyl acrylate), and
(iii) 0.5% to 15% by weight of (meth)acrylic acid (preferably acrylic acid).

In contrast to known acrylate plastisols there is no need for the acrylate binders to be polymer particles having a core-shell morphology; preferably, therefore, they do not have a core-shell morphology.

The sound deadener composition of the invention preferably comprises
(a) 5% to 35%, preferably 10% to 20%, by weight of the polyacrylate binder,
(b) 40% to 90%, preferably 60% to 80%, by weight of inorganic fillers, and
(c) 0% to 50%, preferably 0.1% to 20%, by weight of auxiliaries.

Examples of suitable inorganic fillers include calcium carbonate, kaolin, mica, silica, chalk, microdolomite, finely ground quartz, talc, clay, barium sulfate, alumina, iron oxide, titanium dioxide, glass powders, glass flakes, magnesium carbonate, aluminum hydroxide, bentonite, fly ash, kieselguhr, perlite and, mica. It is preferred to use flakelike fillers such as mica, for example, alone or in combination with typical inorganic pigments such as calcium carbonate, kaolin, silica or talc. Preferred fillers are kaolin, chalk, barium sulfate, carbon black, graphite, talc, clay minerals, microdolomite, finely ground quartz, and mica.

It is preferred to use 50 to 700 or 100 to 600 parts by weight of inorganic filler to 100 parts by weight of polyacrylate binder, and preferably 30 to 150 or 40 to 120 parts by weight of flakelike fillers are used per 100 parts by weight of polyacrylate binder.

Examples of auxiliaries, which are used preferably to an extent of at least 0.1% by weight, from 0.2% to 10% by weight for example, include crosslinkers, thickeners, rheological additives, resins, plasticizers, organic and inorganic pigments, cosolvents, stabilizers, wetting agents, preservatives, foam inhibitors, glass or plastics beads, hollow glass or plastics bodies, antifreeze agents, dispersants, antioxidants, UV absorbers, antistats, and pigment dispersants. Among the auxiliaries, one, two or a plurality may be used in combination. Examples of suitable cosolvents are ethylene glycol, ethylene glycol alkyl ethers (e.g., Cellosolve® products), diethylene glycol alkyl ethers (e.g., Carbitol® products), Carbitol acetate, Butylcarbitol acetate or mixtures thereof. Examples of thickeners are polyvinyl alcohols, cellulose derivatives or polyacrylic acids, in amounts of, for example, 0.01 to 4 or of 0.05 to 1.5 or of 0.1 to 1 part by weight, based on 100 parts by weight of solids. Examples of dispersants are sodium hexametaphosphate, sodium tripolyphosphates, or polycarboxylic acids. Examples of antifreeze agents are ethylene glycol or propylene glycol. Examples of foam inhibitors include silicones. Examples of stabilizers are polyvalent metal compounds such as zinc oxide, zinc chloride or zinc sulfate. The auxiliaries are preferably used at not less than 0.1% by weight and are preferably selected from crosslinkers, thickeners, rheological additives, resins, plasticizers, cosolvents, defoamers, preservatives, antifreeze agents, and pigment dispersants.

The sound deadener composition of the invention is preferably solvent-free, in other words containing no organic solvents, or at any rate less than 5% by weight of organic solvents, having a boiling point of less than 200° C.

In one embodiment of the invention the sound deadener composition contains no high molecular mass binders or no pulverulent binders, more particularly no binders having a K value of more than 40 or more than 35, or having a K value which is no longer measurable. In this embodiment, the polyacrylate binder preferably has acid groups and the sound deadener composition preferably comprises at least one crosslinker which is reactive with acid groups. The acid groups can be obtained by copolymerization with an acid monomer, e.g., acrylic acid or methacrylic acid. The crosslinker may be selected from the group consisting of isocyanate crosslinkers, carbodiimide crosslinkers, epoxy crosslinkers, oxazoline crosslinkers, and silane crosslinkers, preferably polymeric or oligomeric epoxy crosslinkers, more particularly epoxy-modified acrylic polymers. An example of a suitable epoxy crosslinker is Joncryl® ADR 4380. In this embodiment a crosslinking takes place, preferably with thermal induction, during or after the application of the sound deadener composition to the substrate.

In another embodiment of the invention the sound deadener composition further comprises at least one high molecular mass or pulverulent binder, more particularly a binder having a K value of more than 40 or more than 45, or having a K value which is no longer measurable. In this embodiment the sound deadener composition preferably comprises at least one plasticizer for the additional binder.

In one embodiment of the invention the polyacrylate binder has a K value of greater than or equal to 20, preferably greater than or equal to 25, and the sound deadener composition comprises at least one plasticizer.

As plasticizing agents, often also called plasticizers, it is enough in many cases to use a single plasticizer, but it may also be advantageous to use a mixture of two or more different plasticizers. Examples of plasticizers are phthalates, such as diisodecyl phthalate, diethylhexyl phthalate, diisononyl phthalate, di-C7-C11 n-alkyl phthalate, dioctyl phthalate, tricresyl phosphate, dibenzyltoluene, and benzyl octyl phthalate. In addition it is also possible to use other compounds such as citrates, phosphates, adipates, benzoates, and esters of diisononylcyclohexanedicarboxylic acid (DINCH). The stated plasticizers may also be used in the form of mixtures. The proportions may vary within wide ranges. In typical compositions, the plasticizers are present in fractions of 50 to 300 parts by weight, per 100 parts by weight of the polymer to be plasticized. For conformity with the rheological requirements it is possible, moreover, to use solvents (such as hydrocarbons, for example) as diluents.

It is also possible to add adhesion promoters in amounts of, for example, 40-120 parts by weight, examples being polyaminoamides, blocked isocyanates or self-crosslinking blocked isocyanates.

The quality of the sound deadener composition can be measured by measurement of the flexural vibrations by the resonance curve method in accordance with ISO 6721-1 and ISO 6721-3. One measure of the vibration-damping effect is the loss factor tan delta. With sound deadener compositions of the invention, the maximum value of the loss factor tan delta is situated preferably in the range from −20 to +70° C. Where two or more different binders are used, there are generally two or more maxima to the loss factor, at not less than two different temperatures. In this case it is preferred for all of the maxima of the loss factor to be situated within the range from −20 to +70° C. Where crosslinkers are used, the values relate to the crosslinked sound deadener composition.

The invention also provides a method for damping oscillations or vibrations of components of vehicles or machines, by
(1) providing a sound deadener composition as described in more detail above, and
(2) applying the sound deadener composition to a component of a vehicle or of a machine, and subjecting it optionally to drying and/or to crosslinking.

Application may take place in a usual way, as for example by brushing, rolling or spraying. The amount applied is preferably from 1 to 7 kg/m$^2$ or from 2 to 6 kg/m$^2$ after drying. Drying may take place at ambient temperature or, preferably, by application of heat. The drying temperatures are preferably from 80 to 210° C. or from 90 to 180° C. or from 120 to 170° C.

The sound deadener composition may be employed, for example, in vehicles of all kinds, more particularly road-going motor vehicles, automobiles, and rail vehicles, and also in boats, aircraft, electrical machines, construction machines, and buildings.

The invention also provides a substrate at least partly coated with a sound deadener composition as described above.

The sound deadener compositions of the invention have good performance properties in terms of good application qualities and good vibration-damping qualities, and are notable for low water absorption capacity and for avoidance of blistering.

EXAMPLES

Substances Used

Joncryl® ADR 4380 crosslinker, epoxide-modified acrylic polymer
Acronal® DS 3502 aqueous polymer dispersion, polyacrylic ester Example 1

Low Molecular Mass Resin, Polymerized in Isopropanol

A polymerization apparatus made up of glass reactor, reflux condenser, stirrer, and nitrogen inlet is charged under a gentle stream of nitrogen with 1611 g of isopropanol, and this initial charge is heated to 80° C. 37.5 g of a monomer mixture made up of 423.75 g of n-butyl acrylate, 270 g of methyl methacrylate, and 56.25 g of acrylic acid are added. When 80° C. have been regained, 23 g of an initiator solution consisting of 20 g of tert-butyl perpivalate (75% strength in mineral oil) and 210 g of isopropanol are added, and polymerization is commenced for 3 minutes. Then the remaining 712 g of monomer mixture and 207 g of initiator solution are run in over 3 hours. The temperature is subsequently raised to 90° C. and a solution of 2.4 g of tert-butyl perpivalate (75% strength in mineral oil) in 37.5 g of isopropanol is added over 30 minutes. Thereafter, reduced pressure is applied, and the solvent is removed by distillation at not more than 135° C. and at less than 50 mbar. This is followed by degassing with slow stirring for 1 hour at 135° C. and optimum vacuum.

K value; 1% in THF at 21° C.: 16.6
Zero-shear viscosity at 130° C.: 5.5 Pa s

Example 2

Low-Molecular Mass Resin, Polymerized in O-Xylene

A polymerization apparatus made up of glass reactor, reflux condenser, stirrer, and nitrogen inlet is charged under a gentle stream of nitrogen with 484.1 g of o-xylene, and this initial charge is heated to 140° C. At 120° C. 35 g of a monomer mixture made up of 395.5 g of n-butyl acrylate, 252 g of methyl methacrylate, and 52.5 g of acrylic acid are added. At 137° C., 11.2 g of an initiator solution consisting of 28 g of tert-butyl perpivalate (75% strength in mineral oil) and 196 g of o-xylene are added, and polymerization is commenced for 3 minutes. Then the remaining 665 g of monomer mixture and 212.8 g of initiator solution are run in over 3 hours. 15 minutes after the end of the feed, a solution of 2.24 g of tert-butyl perpivalate (75% strength in mineral oil) in 35 g of o-xylene is added over 30 minutes. Thereafter, reduced pressure is applied, and the solvent is removed by distillation at not more than 140° C. and at less than 50 mbar. This is followed by degassing with slow stirring for 1 hour at 140° C. and optimum vacuum.

K value; 1% in THF at 21° C.: 14.4

Zero-shear viscosity at 130° C.: 2.2 Pa s

Example 3

High Molecular Mass Resin with Plasticizer, Polymerized in Methyl Ethyl Ketone (MEK)

A polymerization apparatus made up of glass reactor, reflux condenser, stirrer, and nitrogen inlet is charged under a gentle stream of nitrogen with 813.9 g of methyl ethyl ketone (MEK), and this initial charge is heated to 80° C. 60 g of a monomer mixture made up of 678 g of n-butyl acrylate, 432 g of methyl methacrylate, and 90 g of acrylic acid are added. When 80° C. have been regained, 17.6 g of an initiator solution consisting of 16 g of tert-butyl perpivalate (75% strength in mineral oil) and 336 g of MEK are added, and polymerization is commenced for 3 minutes. Then the remaining 1140 g of monomer mixture and 334.4 g of initiator solution are run in over 3 hours. The temperature is subsequently raised to 90° C. and a solution of 3.48 g of tert-butyl perpivalate (75% strength in mineral oil) in 60 g of MEK is added over 30 minutes. 1200 g of Hexamoll® DINCH (plasticizer) are added. Thereafter, reduced pressure is applied, and the solvent is removed by distillation at not more than 135° C. and at less than 50 mbar. This is followed by degassing with slow stirring for 1 hour at 135° C. and optimum vacuum.

K value; 1% in THF at 21° C.: 32.1 before the plasticizer is added

Zero-shear viscosity with plasticizer at 60° C.: 15.9 Pa s

Example 4

Low-Molecular Mass Resin, Polymerized in O-Xylene

A polymerization apparatus made up of glass reactor, reflux condenser, stirrer, and nitrogen inlet is charged under a gentle stream of nitrogen with 484.1 g of o-xylene, and this initial charge is heated to 140° C. At 120° C. 35 g of a monomer mixture made up of 395.5 g of n-butyl acrylate, 252 g of methyl methacrylate, and 52.5 g of acrylic acid are added. At 137° C., 11.2 g of an initiator solution consisting of 28 g of tert-butyl perpivalate (75% strength in mineral oil) and 196 g of o-xylene are added, and polymerization is commenced for 3 minutes. Then the remaining 665 g of monomer mixture and 212.8 g of initiator solution are run in over 3 hours. 15 minutes after the end of the feed, a solution of 2.24 g of tert-butyl perpivalate (75% strength in mineral oil) in 35 g of o-xylene is added over 30 minutes. Thereafter, reduced pressure is applied, and the solvent is removed by distillation at not more than 140° C. and at less than 50 mbar. This is followed by degassing with slow stirring for 1 hour at 140° C. and optimum vacuum.

K value; 1% in THF at 21° C.: 14.4

Zero-shear viscosity at 60° C.: 595.9 Pa s

Example 5 acResin® DS 3500 (Acrylate Resin with Acid Groups)

K value, 1% in THF at 21° C.: 11 to 16

Viscosity at 20° C.: 150 Pa s

Example 6

Resin as Per Example 4, in Dispersion in Water 100 g of a mixture of a resin from example 4 and Joncryl® ADR 4380 in a ratio of 75:25 are dispersed at 90° C. in a glass beaker with 99 g of distilled water and with 1 g of 25% strength aqueous ammonia for 3 minutes, using a disk dissolver.

Solids content: 50%

Example 7

Dispersion Acronal® DS 3502

Viscosity DIN EN ISO 3219: 2 to 6 Pa s
Solids content: 55%
Preparation of Sound Deadener Compositions a1 and A2:
The resin from examples 1 and 2, respectively, is admixed at 90° C. with Joncryl® ADR 4380 in a ratio of 85:15 and mixed in a Speedmixer at 2750 rpm for 20 seconds. Then barium sulfate and chalk (Omyacarb® 20BG) in equal weight fractions are added to the binder (resin plus crosslinker) in a ratio of 85:15 (filler:binder) and heated at 90° C. for 30 minutes more. The composition is subsequently homogenized in the Speedmixer at 2750 rpm for 1 minute.

Preparation of Sound Deadener Compositions A3 and A4:
The resin from examples 4 and 5, respectively, is admixed at 90° C. with Joncryl® ADR 4380 in a ratio of 75:25 and mixed in a Speedmixer at 2750 rpm for 20 seconds. Then mica (muscovite mica GHL 144) and chalk (Omyacarb® 20BG) (in a ratio of 1:2) are added to the binder (resin plus crosslinker) in a ratio of 70:30 (filler:binder) and heated at 90° C. for 30 minutes more. The composition is subsequently homogenized in the Speedmixer at 2750 rpm for 1 minute.

Preparation of Sound Deadener Composition A5:
The resin from example 2 is mixed at 90° C. with a suspension of the acrylate powder Acronal® S 629P in Hexamoll® DINCH and Joncryl® ADR 4380 (resin:acrylate powder:Hexamoll:Joncryl=1:1:1:1) and mixed in a Speedmixer at 2750 rpm for 20 seconds. Then barium sulfate and chalk (Omyacarb® 20BG) (in equal weight fractions) are added to the binder (resin, acrylate powder, Hexamoll, and Joncryl) in a ratio of 85:15 (filler:binder) and heated at 90° C. for 30 minutes more. The composition is subsequently homogenized in the Speedmixer at 2750 rpm for 1 minute.

Preparation of Sound Deadener Composition A6:
The aqueous dispersion from example 6 is admixed at room temperature in a ratio of 70:30 (solids:solids) with the fillers mica (muscovite mica GHL 144) and chalk (Omyacarb® 20BG) (in a ratio of 1:2) by means of a dissolver-stirrer and then homogenized in the Speedmixer (beginning at 800 rpm for 10 seconds, thereafter rising to 2500 rpm over the course of 20 seconds, and maintaining this rpm for 30 seconds).

Preparation of Sound Deadener A7:

The aqueous dispersion from example 7 is admixed at room temperature in a ratio of 75:25 (solids:solids) with the fillers barium sulfate and chalk (Omyacarb® 20BG) (in a ratio of 1:1) and also with 4% of diethylene glycol and 2% of Viskalex® HV30 by means of a dissolver-stirrer and then homogenized in the Speedmixer (beginning at 800 rpm for 10 seconds, thereafter rising to 2500 rpm over the course of 20 seconds, and maintaining this rpm for 30 seconds).

Measurement of Zero-Shear Viscosity

The zero-shear viscosity is the limiting value of the viscosity function at infinitely low shear rates. It is measured using an Anton Paar MCR 100 Rheometer (US 200 analysis software) in plate/plate geometry. The samples are measured in oscillatory shear with a low shear amplitude of 10%. Temperature 130° C. (or as indicated), oscillating frequency ramp log 100-0.1 1/s, measurement slit 0.5 mm, evaluation by Carreau-Gahleitner I, die diameter 25 mm.

Description of the Mixing Assembly

Speedmixer:

A Hauschild DAC 400FVZ SpeedMixer is used. This is a rotary mixer, which mixes the samples thoroughly without incorporation of air. The rotary speed can be set within a range from 800 to 2750 1/min.

Dissolver-Stirrer:

The apparatus consists of a stirring mechanism, a shaft driven by the mechanism, and a dissolver disk as stirring tool. With this form of mixing, air is incorporated into the sample. The stirring speed can be set in the range of 0-1000 1/min. The dissolver disk is a disk with teeth on its periphery, of the kind known to the expert for the dispersing of resins, for example, in water in the paints and coatings industry.

Performance Tests

Determination of Loss Factor

For the purposes of assessing the vibration damping behavior, a measurement is made of the loss factor tan delta at 25° C., in the manner described in WO 2007/034933 (in analogy to ISO 6721-1 and ISO 6721-3). For this purpose, a sheet steel test specimen with a size of 30×300×1.6 mm is coated with the sound deadener composition under test, which is dried at 160° C. for 30 minutes.

The coating rate is approximately 3.0 kg per m².

Determination of Water Absorption:

The water absorption is determined in a method based on DIN EN ISO 62:2008. For this purpose, films with a thickness of approximately 2 mm and side length each of 25 mm are produced from the sound deadener compositions prepared. The films are dried first at room temperature (20° C.) for 24 hours, then at 160° C. for 30 minutes, and are each stored for 24 hours or 7 days in demineralized water. A determination is made of the relative mass increase during storage. This increase is determined gravimetrically using a Mettler Toledo AG204 analytical balance. The results are set out in table 1.

Sagging Test:

The sagging test is used to assess the behavior of the sound deadener compositions in a drying cabinet at 160° C. It involves the application to a metal test plate of a sample in bead form (thickness about 3 mm and edge length 10 mm×20 mm) at 90° C. (compositions A1 to A5) or at room temperature (compositions A6 and A7). The plate is then placed upright in a drying cabinet at 160° C., and the sagging of the composition in centimeters before respective hardening, but no later than after 60 minutes, is ascertained.

Blistering:

The sound deadener composition in a thickness of 3 mm with an edge length of 60 mm×100 mm is assessed visually after drying at 160° C. for 30 minutes. The rating scale used in this assessment is as follows:

1: No blisters
2: 2-3 small blisters
3: Slight lifting of the composition
4: Large blister, dishing of entire composition.

TABLE 1

| Example | tan delta max | Full width at half maximum [° C.] | T max [° C.] | Water absorption [after 24 h/ 7 d in %] | Sagging test [cm/time] | Blisters |
|---|---|---|---|---|---|---|
| A1 | | | | 1/3 | 9/3 min | 1 |
| A2 | | | | 1/3 | 9/3 min | 1 |
| A3 | 0.2 | 28 | 14 | 0.8/1.3 | 9/3 min | 1 |
| A4 | 0.18 | 26 | −12 | 1.5/2.2 | 9/3 min | 1 |
| A5 | | | | 2/4 | 0/60 min | 1 |
| A6[1)] | 0.18 | 28 | 14 | 20/24 | 0/60 min | 3 |
| A7[1)] | 0.18 | 26 | 22 | 17/18 | 0/60 min | 3 |

[1)]Comparative

The results show that particularly low water absorption and a particularly low tendency toward blistering are achieved with examples A1 to A5. Example A5, furthermore, is notable for particularly good sagging behavior.

The invention claimed is:

1. A nonaqueous sound deadener composition, comprising
    (a) at least one nonpulverulent, solvent-free polyacrylate binder having a K value in the range from 10 to 35, measured as a 1% strength solution in tetrahydrofuran at 21° C., wherein the polyacrylate binder consists of reacted units of methyl (meth)acrylate, a C2 to C4 alkyl acrylate, and (meth)acrylic acid, and, optionally, one or more monomers selected from the group consisting of a vinylaromatic having up to 20 C atoms, an ethylenically unsaturated nitrile, a vinyl halide, a vinyl ether of an alcohol comprising 1 to 10 C atoms, an aliphatic hydrocarbon having 2 to 8 C atoms and one or two double bonds, and mixtures of these monomers, wherein the polyacrylate binder is at least 60% by weight of $C_1$ to $C_{10}$ alkyl (meth)acrylates; and
    (a1) one or more crosslinkers; and
    (b) one or more inorganic fillers wherein the inorganic filler is present in an amount of 40% to 90% by weight based on the total weight of the nonaqueous sound deadener composition;
    wherein the K value of the polyacrylate binder is measured as a 1% solution in THF at 21° C. before the polyacrylate binder is reacted with the crosslinkers.

2. The sound deadener composition according to claim 1, wherein the polyacrylate binder has a glass transition temperature in the range from −60 to +80° C.

3. The sound deadener composition according to claim 1, wherein the polyacrylate binder does not have a core-shell morphology.

4. The sound deadener composition according to claim 1, wherein the polyacrylate binder at 130° C. has a zero-shear viscosity of not more than 40 Pas.

5. The sound deadener composition according to claim 1, wherein the polyacrylate binder consists of methyl (meth) acrylate, $C_2$ to $C_4$ alkyl acrylate, and 0.5% to 15% by weight of (meth)acrylic acid.

6. The sound deadener composition according to claim 1, comprising
   (a) 5% to 35% by weight of the polyacrylate binder, and
   (c) 0% to 50% by weight of auxiliaries.

7. The sound deadener composition according to claim 6, wherein the inorganic fillers are selected from the group consisting of kaolin, chalk, barium sulfate, carbon black, graphite, talc, clay minerals, microdolomite, finely ground quartz, and mica, and the auxiliaries are present to an extent of at least 0.1% by weight and are selected from the group consisting of thickeners, rheological additives, resins, plasticizers, cosolvents, defoamers, preservatives, antifreeze agents, and pigment dispersants.

8. The sound deadener composition according to claim 1, wherein the sound deadener composition is solvent-free.

9. The sound deadener composition according to claim 1, further comprising a pulverulent binder and optionally a plasticizer for the pulverulent binder.

10. The sound deadener composition according to claim 1, wherein the crosslinker is reactive with acid groups.

11. The sound deadener composition according to claim 1, wherein the crosslinker is selected from the group consisting of isocyanate crosslinkers.

12. The sound deadener composition according to claim 1, wherein the polyacrylate binder has a K value of less than or equal to 25 and the sound deadener composition comprises at least one plasticizer.

13. The sound deadener composition according to claim 1, wherein the crosslinker is a polymeric epoxy crosslinker and/or an oligomeric epoxy crosslinker.

14. The sound deadener composition according to claim 1, wherein the crosslinker is an epoxide-modified acrylic polymer, the K value of the polyacrylate binder is from 14.4 to 32.1, measured as a 1% strength solution in tetrahydrofuran at 21° C., wherein the inorganic filler is present in an amount of 70% to 85% by weight based on the total weight of the nonaqueous sound deadener composition.

15. The nonaqueous sound deadener composition of claim 1, wherein the nonpulverulent, solvent-free polyacrylate binder consists of reacted units of the methyl (meth)acrylate, the C2 to C4 alkyl acrylate, and the (meth)acrylic acid.

16. A method of damping vibrations of bodywork parts of a vehicle, comprising applying the sound deadener composition according to claim 1 to the bodywork parts.

17. A method for damping oscillations or vibrations of components of vehicles or machines, comprising
   (1) providing the sound deadener composition according to claim 1, and
   (2) applying the sound deadener composition to a component of a vehicle or of a machine, and optionally subjecting the component to drying and/or to crosslinking.

18. A substrate at least partly coated with the sound deadener composition according to claim 1.

19. An automotive vibration dampening system, comprising:
   an automotive bodywork comprising a metal substrate and a layer of the sound deadener composition of claim 1 adhered to the metal substrate.

* * * * *